June 15, 1937.  G. F. CAVANAGH  2,084,016
COVER FOR AUTOMOBILE RUNNING BOARDS AND THE LIKE
Filed May 11, 1934
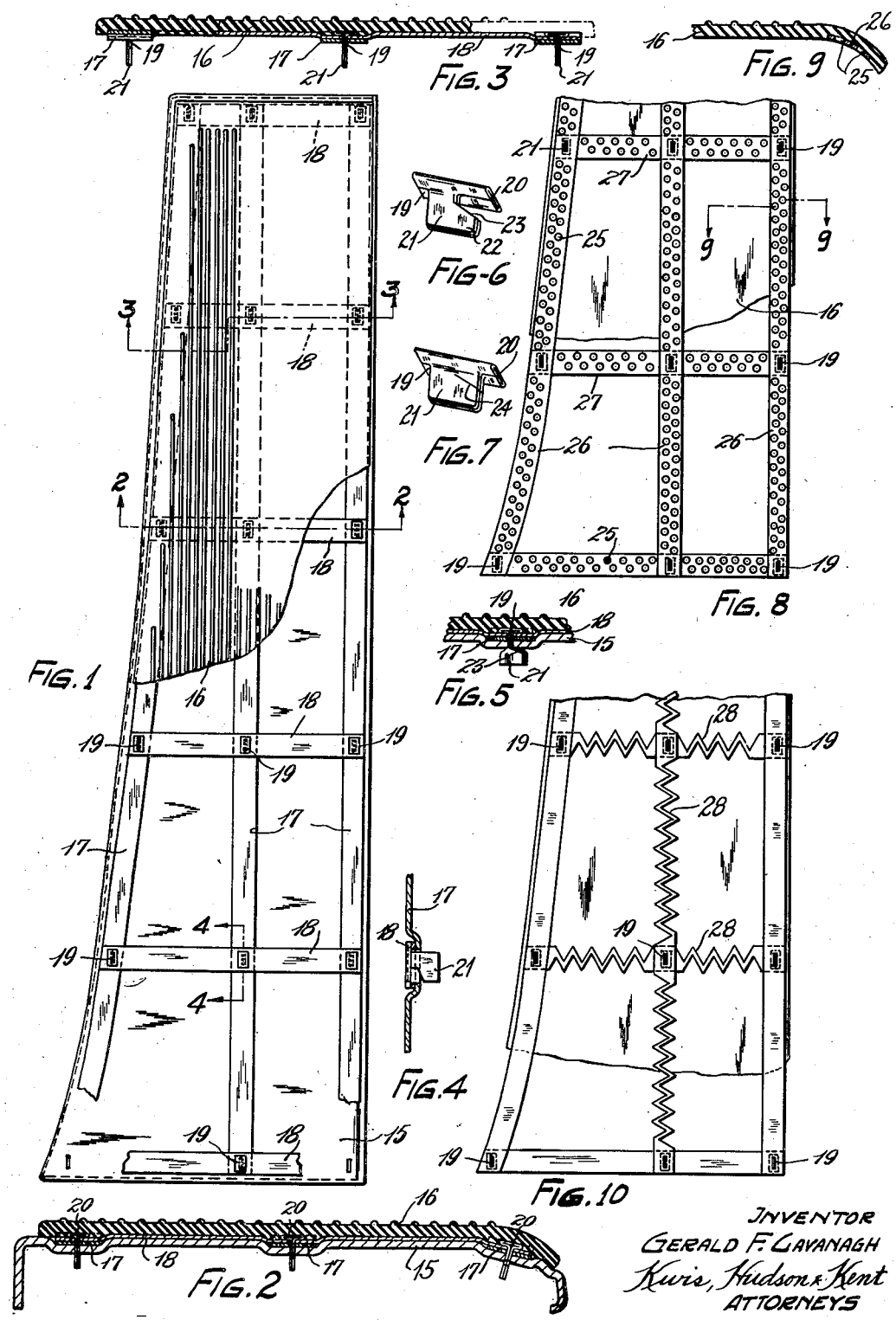
INVENTOR
GERALD F. CAVANAGH
Kuris, Hudson & Kent
ATTORNEYS Patented June 15, 1937

2,084,016

UNITED STATES PATENT OFFICE 2,084,016

COVER FOR AUTOMOBILE RUNNING BOARDS AND THE LIKE

Gerald F. Cavanagh, Euclid, Ohio, assignor to The Ohio Rubber Company, Willoughby, Ohio, a corporation of Ohio Application May 11, 1934, Serial No. 725,164

9 Claims. (Cl. 280—169)

This invention relates to covers for automobile running boards and the like.

It has been customary practice in recent years, in fact almost universal practice, to cover automobile running boards with rubber which is vulcanized directly to the boards. The covering of running boards in this manner has proved to be very satisfactory in so far as permanence of attachment, wearing qualities, and appearance are concerned, but the recent stream-lining of automobiles has involved the use of deeply drawn and curved running boards, greatly increasing the cost of the molds used in vulcanizing the rubber to the running boards and in some instances making desirable the fastening of the covers to the running boards by mechanical fastening means.

The principal object of the present invention therefore is to provide a flexible cover molded from rubber or other suitable composition of a plastic nature and having provision for fastening or both reenforcing and fastening of such a nature that the cover can be made to conform to the irregular shape of the board and lie flat thereon over its entire area and be securely fastened thereto in a permanent manner.

The above and other objects are attained by the present invention which may be briefly summarized as consisting in certain novel details of construction and combinations and arrangements of parts which will be described in the specification and set forth in the appended claims.

In the accompanying sheet of drawings wherein I have shown slightly different embodiments of the invention, Fig. 1 is a plan view of a running board to which my improved cover is applied, the rubber of a portion of the cover being broken away from the cover reenforcement and a portion of the reenforcement being broken away at the lower left hand corner of the figure;

Fig. 2 is a transverse sectional view of the same substantially along the line 2—2 of Fig. 1;

Fig. 3 is a cross-sectional view substantially along the line 3—3 of Fig. 1 showing the cover alone before it is applied to the board;

Fig. 4 is a fragmentary sectional view substantially along the line 4—4 of Fig. 1;

Fig. 5 is a fragmentary transverse sectional view taken through the clip substantially as it appears in Fig. 2, but with the shank portion of the clip twisted to pull the cover down onto the running board;

Fig. 6 is a perspective view of the fastening clip detached;

Fig. 7 is a similar view showing a slight modification in the form of the clip;

Fig. 8 is a view looking at the under side of a portion of the running board cover with part of the rubber removed from the reenforcement, this view showing a slight modification in the form of the reenforcement;

Fig. 9 is a fragmentary transverse sectional view along the line 9—9 of Fig. 8, and Fig. 10 is a view similar to Fig. 8 showing a still different modification.

Referring now to the drawing, 15 represents a typical sheet metal running board, the same being generally curved downwardly at the front as shown at the right hand side of Fig. 2, flanged downwardly at the rear and at its ends, and also being generally curved lengthwise and otherwise to conform to the curves of adjoining parts of the automobile. While the part or top to which my improved cover is adapted to be applied is generally an automobile running board, the cover may be attached to other tread members or parts other than running boards. Furthermore, while the tread portion of the cover is generally formed of soft vulcanized rubber, the term "rubber" as used herein is intended to cover equivalent or like materials which are initially in plastic form.

My improved cover includes an upper layer 16 of soft vulcanized rubber or equivalent material, as stated above, and a metal reenforcement which forms a framework to which the rubber layer 16 is molded and vulcanized, with the framework flush with the lower surface of the rubber. This frame or framework is in this instance composed of longitudinally extending strips 17 and transverse strips 18 arranged in overlapping relationship. The longitudinal strips extend substantially the full length of the cover and the transverse strips substantially the full width thereof, although in all instances the rubber at the margin of the cover preferably extends slightly beyond the reenforcement. The number of longitudinal and transverse strips may be varied as desired, but in this instance I have shown three longitudinal strips, one at the rear edge of the cover, one at the front edge, and one extending substantially centrally thereof. Where the strips cross each other they are fastened together by clips 19 which are employed to fasten the cover to the running board, the clips tying the pieces together in the form of a flexible but unitary framework which can be made up outside the mold and placed as a unit in the bottom of the mold, after which the layer of rubber is placed on top of the framework and the molding and vulcanizing operation is then carried out to complete the cover.

Where the strips cross each other, the lower strips are offset or depressed so that the top surface of the strips will lie in the same plane, and, if desired, they may be further depressed to accommodate the heads of the fastening clips so that the latter will not project up any material extent into the rubber above the framework. However, since the heads of the clips are not thick they can lie on top of the strips without effecting to a material extent the appearance of the rubber after it is applied to the framework.

The mechanical fasteners or clips 19 are formed of sheet metal, the flat elongated head portion 20 being formed by doubling the metal upon itself and the shank portion 21 also being formed of two thicknesses of metal. The shank 21 shown in Fig. 6 has at the bottom a lateral extension 22 with a beveled upper edge 23, the parts being so proportioned that when the cover is applied to the board with the shanks extending at least partially through the slots in the board and when the shanks are turned or twisted in the manner indicated partially in Fig. 5, the upper beveled edge 23, by engagement with the lower surface of the board, has a camming action which pulls the cover down tightly against the top surface of the board. Instead of providing a notch in the shank 21, as in Fig. 6, the shank may be provided with an inclined slit 24. The clip shown in Fig. 7 has the advantage over that shown in Fig. 6 that there is less likelihood of rubber being forced down through the slot formed in the reenforcing strip through which the shank extends during the molding and vulcanizing operation, as occurs sometimes when the shank is notched as in Fig. 6. I might state that in forming the slots in the overlapping portions of the strips 17 and 18, the slots are of course elongated to conform to the elongated shape of the shanks of the clips, and they are made just wide enough to permit the shanks of the clips to be forced through so that in the molding and vulcanizing operation there will be very little, if any, rubber forced down through the slots formed in the strips, the heads of the clips overlapping the slots so as to form a cover or shield to prevent the rubber from being to any objectionable extent forced through the slots. It will be understood, of course, that the running board itself will also be provided with slots to accommodate the shanks of the clips, and when the cover is applied to the board, the shanks of the clips will extend down through the slots formed in the running board, after which the shank of each clip will be turned or twisted to produce the binding and camming action referred to, thereby pulling the cover down tightly against the running board.

It will be understood that the clips will be located wherever necessary, the number and location thereof depending largely upon the shape and design of the cover and the flexing or curve which must be imparted to the cover to make it conform to and to cause it to be securely held down against the board. The upper surface of the rubber 16 may be ribbed or have any other desired configuration, ribbing being shown in this instance.

To keep down the first cost of the covers, the rubber layer is no thicker than necessary to provide the desired wearing qualities and durability. Accordingly, the rubber layer, in practice, is fairly thin and therefore care must be exercised that the reenforcing strips do not form irregularities on the upper surface of the rubber so as to make their location visible. Experiments have demonstrated that unless the rubber layer is made thicker than necessary, the strips, and particularly the transverse strips, would cause slight elevations in the top surface of the rubber. I have found that this can be minimized or entirely removed by breaking or modifying the continuity of the strips. One method effective for this purpose is to provide the strips, and especially the transverse strips, with rather closely arranged perforations 25 somewhat as shown in Fig. 8, where the longitudinal strips are designated 26 and the transverse strips 27. These perforations 25 are filled with rubber during the molding and vulcanizing operation, and they therefore not only serve the purpose of concealing the location of the reenforcing strips but the rubber which fills the perforations acts as a mechanical interlock between the rubber cover and the strips.

Another expedient employed by me for this purpose is to make the strips of irregular form, as, for example, in zigzag form, indicated at 28 in Fig. 10. It will be understood that all of the strips or part of them may be made in this manner, that is, made of zigzag form instead of with continuous parallel edges, this being done of course in the blanking operation. Where the strips cross each other or overlap, the zigzagging is omitted so as to provide a sufficient area in the overlapping portions to receive the fastening clips 19, i. e., sufficient unbroken area in both strips for the slots to accommodate the shanks of the clips and for the heads of the clips. It will be understood that other means of breaking up the continuity of the otherwise straight strips may be utilized.

If desired, the front portion of the cover with its front longitudinal strip may be molded on a curve, as shown in Fig. 9, which in this instance shows one of the perforated longitudinal strips 26 of Fig. 8.

While I have shown the preferred embodiment and certain modifications of my invention, I aim in my claims to cover all modifications which do not involve a departure from the spirit and scope of the invention in its broader aspects.

Having thus described my invention, I claim:

1. A running board cover comprising an upper layer of rubber and a metal reenforcement to which the rubber is molded and vulcanized, and means for fastening the cover to a running board comprising a series of clips each having a head portion embedded in the lower part of the rubber next to the reenforcement and a shank portion extending through the lower face of the reenforcement with a lateral extension having a cam surface thereon adapted when the shank portion is twisted to bind the cover to the running board.

2. A running board cover comprising an upper layer of rubber and a metal reenforcement to which the rubber is molded and vulcanized, and mechanical fasteners having head portions embedded in the lower portion of the layer next to the reenforcement and having shanks extending through slots in the reenforcement, the shanks each having at one side thereof a lateral extension with a cam surface thereon whereby when the shanks are extended through slots in a running board and are bent the cam surface coacts with the under side of the running board to pull the cover down onto the same, said extension being of substantial length such that when the cover is applied to the running board at least a portion of the cam surface will extend below the underside of the board.

3. A running board cover comprising an upper layer of rubber, a metal reenforcement onto which the rubber is molded and vulcanized with the lower face of the reenforcement substantially flush with the lower face of the rubber, said reenforcement comprising a framework of strips, and mechanical fasteners having head portions embedded in the rubber next to the reenforcement and shank portions extending through the strips.

4. A running board cover comprising an upper layer of rubber, a metal reenforcement onto which the rubber is molded and vulcanized, said reenforcement comprising a framework of longitudinally and transversely extending overlapping strips, and mechanical fasteners having head portions embedded in the rubber next to the reenforcement and shank portions extending through the strips where they are in overlapping relationship.

5. A running board cover comprising an upper layer of rubber, a metal reenforcement onto which the rubber is molded and vulcanized, said reenforcement comprising a framework of longitudinally and transversely extending overlapping strips, the lower sides of the strips being substantially flush with the lower face of the rubber, and mechanical fasteners having head portions embedded in the rubber next to the reenforcement and shank portions extending through the strips where they are in overlapping relationship.

6. A running board cover comprising a layer of rubber with a metal reenforcement embedded in the lower part thereof, the reenforcement being composed of strips of metal with their continuity interrupted so as to decrease the likelihood of their location being discernible from the top of the cover.

7. A flexible running board cover comprising an upper layer of rubber, a metal reenforcement embedded in the lower portion thereof and composed of strips extending lengthwise and crosswise of the cover, the strips being perforated to break the continuity of the strips, and mechanical fasteners having their head portions embedded in the rubber next to the strips and portions extending through the strips.

8. A flexible running board cover comprising an upper layer of rubber and a reenforcement embedded in the lower portion of the rubber and composed of metal strips at least part of which have an irregular contour at their edges so as to break the continuity thereof, and mechanical fasteners having their head portions embedded in the lower part of the rubber in engagement with the strips and shank portions extending through the strips.

9. In a running board, a supporting member having a plurality of apertures therethrough, a covering of flexible material having reenforcing and securing means associated therewith, the reenforcing means comprising strips of metal extending longitudinally of the cover and spaced apart transversely thereof and embedded in said flexible material to lie substantially flush with the underside of the cover, said strips having apertures therein arranged to be substantially in alignment with the apertures in the supporting member when the cover is in position on said supporting member, the securing means comprising members extending through the apertures in the reenforcing strips and the supporting member and adapted to be interlocked with the supporting member to pull the cover tightly down against the surface of the supporting member.

GERALD F. CAVANAGH.